United States Patent [19]

Kishi et al.

[11] Patent Number: 4,663,705

[45] Date of Patent: May 5, 1987

[54] METHOD FOR INSERTING DATA INTO A PROGRAM AT A PROGRAM POSITION WHICH CORRESPONDS TO A DISPLAYED CURSOR POSITION

[75] Inventors: Hajimu Kishi; Kunio Tanaka; Takashi Takegahara, all of Tokyo, Japan

[73] Assignee: Fanuc Ltd., Minamitsuru, Japan

[21] Appl. No.: 672,256

[22] PCT Filed: Mar. 19, 1984

[86] PCT No.: PCT/JP84/00115

§ 371 Date: Oct. 24, 1984

§ 102(e) Date: Oct. 24, 1984

[87] PCT Pub. No.: WO84/03780

PCT Pub. Date: Sep. 27, 1984

[30] Foreign Application Priority Data

Mar. 20, 1983 [JP] Japan ............... 58-048464

[51] Int. Cl.⁴ .................................... G05B 19/40
[52] U.S. Cl. ....................... 364/191; 340/706
[58] Field of Search ........... 364/191, 192, 188, 189; 340/706–712

[56] References Cited

U.S. PATENT DOCUMENTS

| | | | |
|---|---|---|---|
| 4,396,977 | 8/1983 | Slater | 364/500 |
| 4,451,895 | 5/1984 | Sliwkowski | 340/708 |
| 4,479,197 | 10/1984 | Haag | 340/712 |
| 4,490,781 | 12/1984 | Kishi | 364/521 |
| 4,519,026 | 5/1985 | Nozawa | 364/131 |
| 4,521,860 | 6/1985 | Kanematsu | 364/191 |
| 4,530,046 | 7/1985 | Munekata | 364/191 |
| 4,550,221 | 10/1985 | Mabusth | 340/706 |

*Primary Examiner*—Jerry Smith
*Assistant Examiner*—Allen MacDonald
*Attorney, Agent, or Firm*—Staas & Halsey

[57] ABSTRACT

An automatic programming method for creating an NC program by inserting miscellaneous data, such as M-function instruction data, feed rate instruction data, G-function instruction data and S-function instruction data, into previously created path data is disclosed. The method includes steps of displaying a path trajectory comprising a number of path blocks ($b_1, b_2 \ldots b_{16}$) on a display screen (105) by using the path data, positioning a cursor (CSR) at a prescribed position on the path trajectory, entering the miscellaneous data, and inserting the miscellaneous data into a block which is the same as that of the path data which correspond to a path block designated by the cursor, or at least at the front or rear of the block.

6 Claims, 6 Drawing Figures

METHOD FOR INSERTING DATA INTO A PROGRAM AT A PROGRAM POSITION WHICH CORRESPONDS TO A DISPLAYED CURSOR POSITION

BACKGROUND OF THE INVENTION

1. Field of the Invention

This invention relates to an automatic programming method and, more particularly, to an automatic programming method whereby miscellaneous data is inserted into previously created path data to create a numerical control program (NC program).

2. Description of the Related Art

A variety of automatic programming units have recently been put into practical use for the purpose of creating NC programs in a simple manner. With these automatic programming units, path data specifying a path can be simply created.

An NC program is composed not only of path data but also includes miscellaneous data executed or used at proper locations within the path, such data including miscellaneous function instruction data (M-function instruction data), T-function instruction data for designating a tool number, S-function instruction data for designating spindle rpm, F-feedrate instruction data for commanding cutting velocity, G-function instruction data, and the like. It is therefore required that a complete program be created by inserting these miscellaneous data into the above-mentioned path data.

Even if miscellaneous data are included to some degree in path data created by an automatic programming unit, there are many cases where this alone is insufficient and it is necessary to insert separate miscellaneous data into the path data to create a complete program.

FIG. 1 is a schematic view for describing a method of creating path data using an automatic programming unit. Assume that a tool TL is to be moved from a reference point $P_r$ (where $P_{100}$ is the point obtained by projecting the reference point on the XY plane) to a point $P_1'$ in a rapid-traverse mode, thereafter to an approach point $P_a$ at a velocity F0100 (where F is a word address word indicating feedrate), thence to a machining starting point $P_1$ at a cutting velocity F0050, thereafter back to the point $P_1$ along straight lines $S_1 \rightarrow S_2 \rightarrow S_3 \rightarrow S_4$ at the above-mentioned cutting velocity (F0050), and then, upon completion of machining, back to the reference point $P_r$ in the rapid-traverse mode along the path $P_1 \rightarrow P_1' \rightarrow P_r$. In such case the programmer first creates a part program, shown below. Assuming that the distance between the approach point $P_a$ and the reference point $P_r$ along the Z axis is 40, and that the Z-axis coordinate value of the reference point $P_r$ is 50:

| | |
|---|---|
| $P_1 = x_1, y_1$ | (a) |
| $S_1 = xa_1, ya_1; xb_1, yb_1$ | (b) |
| $S_2 = xa_2, ya_2; xb_2, yb_2$ | (c) |
| $S_3 = xa_3, ya_3; xb_3, yb_3$ | (d) |
| $S_4 = xa_4, ya_4; xb_4, yb_4$ | (e) |
| FROM, $P_{100}$, 50Z; | (f) |
| RPD, $P_1$; | (g) |
| DLT, −40, F0100; | (h) |
| DLT, −10, F0050; | (i) |
| $S_1$; | (j) |
| $S_2$; | (k) |
| $S_3$; | (l) |
| $S_4$; $P_1$; | (m) |
| RPD, DLT, 50; | (n) |
| RPD, P100 | (p) |
| M02; | (q) |

In the above statememts, (a) through (e) constitute a graphic definition statement which, by specifying the point $P_1$ and straight lines $S_1$ through $S_4$, defines a machining graphic MFIG in the X-Y plane. Further, (f) through (q) constitute a motion definition statement, in which F0100 and F0050 in (h) and (i) are items of miscellaneous machining information indicative of cutting velocity. "RPD" signifies rapid traverse, the numerical value following "DLT" signifies an incremental value along the Z axis, and M02 signifies the program end.

Next, when the above-described part program has been applied to an automatic programming unit, the latter uses the input part program data to automatically create the following path data:

| | |
|---|---|
| G92 X0.Y0. Z50.; | (F) |
| G91 G00 Xx$_1$ Yy$_1$; | (G) |
| G01 Z-40. F0100; | (H) |
| Z-10. F0050; | (I) |
| Xx$_{12}$ Yy$_{12}$; | (J) |
| Xx$_{23}$ Yy$_{23}$; | (K) |
| Xx$_{34}$ Yy$_{34}$; | (L) |
| Xx$_{41}$ Yy$_{41}$; | (M) |
| G00 Z50.; | (N) |
| X0. Y0.; | (P) |
| M02; | (Q) |

The blocks (F)–(Q) correspond to blocks (f)–(q) in the above-described part program. In the foregoing path data, $(x_1, y_1)$ are the coordinate values of the point $P_1$ in the XY plane, and $(X_{ij}, Y_{ij})$ are incremental values along the respective axes from the starting point of straight line $S_i$ to the point of intersection $P_{ij}$ between the straight line $S_i$ and straight line $S_j$.

However, since the above-mentioned path data are insufficient, S-, M- and T-function instructions must be inserted. As an example, in a case where cutting is to be performed while a spindle is being rotated at a spindle velocity 1500, S-function instruction data "S1500" must be inserted into the block (H). If a coolant is to be turned on prior to the start of cutting and turned off at the end of cutting, then an M-function instruction "M□□" for coolant turn-on must be inserted between the blocks (H) and (I), and an M-function instruction "M       " for coolant turn-off must be inserted between the block (M) and the block "N".

Thus, in order to obtain a complete NC program, it is necessary to insert miscellaneous data into the motion definition statement, or into the path data created by the automatic programming unit, in advance. FIG. 1 is an example of a very simple machining operation. In sophisticated machining, however, it is necessary to insert great quantities of miscellaneous data.

For the above reason, research has been directed toward an arrangement in which an automatic programming unit produces a complete NC program containing all of the miscellaneous data. Nevertheless, a complete NC program cannot be produced for all kinds of machining. In other words, while a complete NC program may be creatable for machining performed by a specific machine tool, a complete NC program cannot necessarily be created for machining performed by another machine tool. In a system designed for general purpose machining programming, adopting an arrangement in which miscellaneous data are produced automatically in response to all requests is undesirable because such would produce a large processing program load.

Accordingly, miscellaneous data must inevitably be inserted into a motion definition statement or path data (hereafter, a motion definition statement will also be referred to as path data) by the operator. Heretofore, however, a method has not been available through which miscellaneous data can be inserted into path data at suitable locations by a simple operation and without error.

SUMMARY OF THE INVENTION

An object of the present invention is to provide an automatic programming method whereby miscellaneous data can be inserted into path data through a simple operation and without error for almost all cases.

Another object of the present invention is to provide an automatic programming method whereby miscellaneous data can be inserted into path data both intuitively and visually.

Still another object of the present invention is to provide an automatic programming method through which a path trajectory is displayed on a display screen on the basis of previously created path data to enable the insertion of miscellaneous data into path data while the path trajectory is observed.

A further object of the present invention is to provide an automatic programming method wherein a cursor is movably along a path trajectory which appears on a display screen and a position at which miscellaneous data are to be inserted is specified by the position at which the cursor is displayed.

The present invention provides an automatic programming method for creating an NC program by inserting miscellaneous data into previously created path data. The automatic programming method including displaying a path trajectory comprising a number of path blocks on a display screen by using the path data, displaying a cursor on the display screen so as to designate a prescribed path block, moving, by operating switches provided on an operator's panel, the position at which the cursor is displayed to a position at which miscellaneous data are to be inserted, subsequently entering the miscellaneous data, and automatically inserting the miscellaneous data into a block which is the same as that of the path data corresponding to the path block designated by the cursor, or in the front or rear of the block.

DESCRIPTION OF THE PREFERRED EMBODIMENTS

Figure 1:
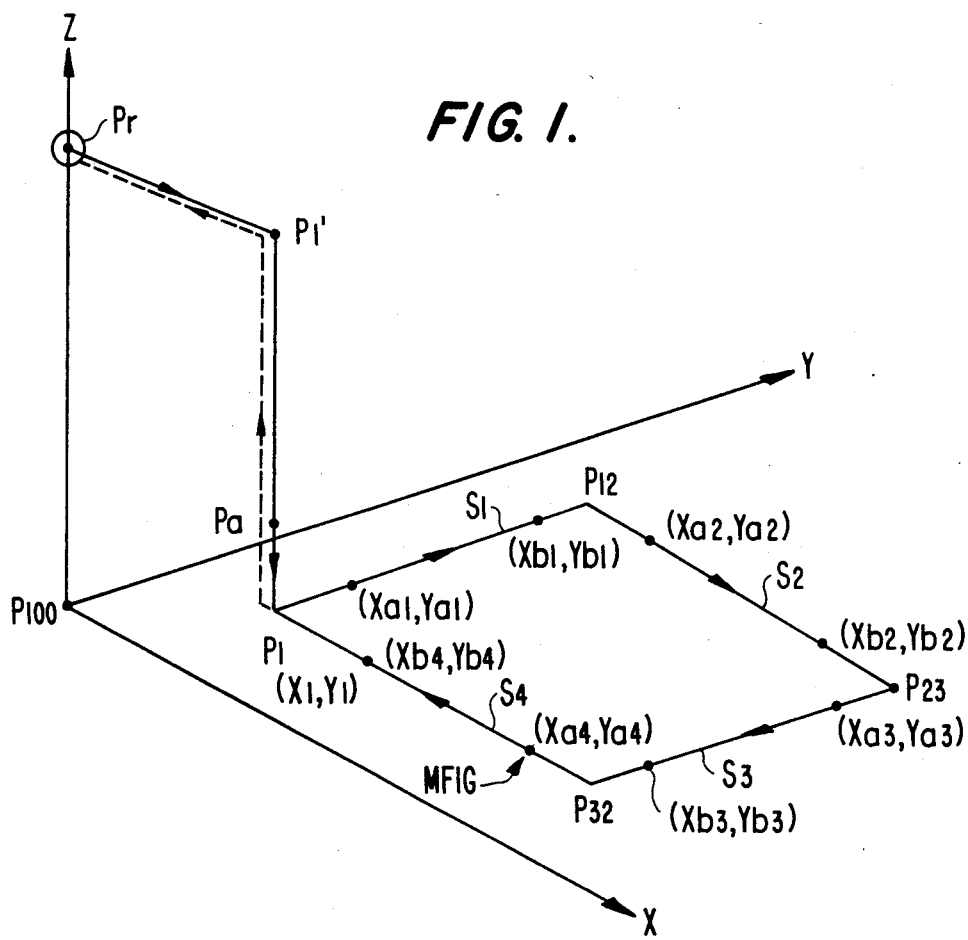
FIG. 1 is an explanatory view of a tool path and is useful in describing an automatic programming method according to the prior art.
Figure 2:
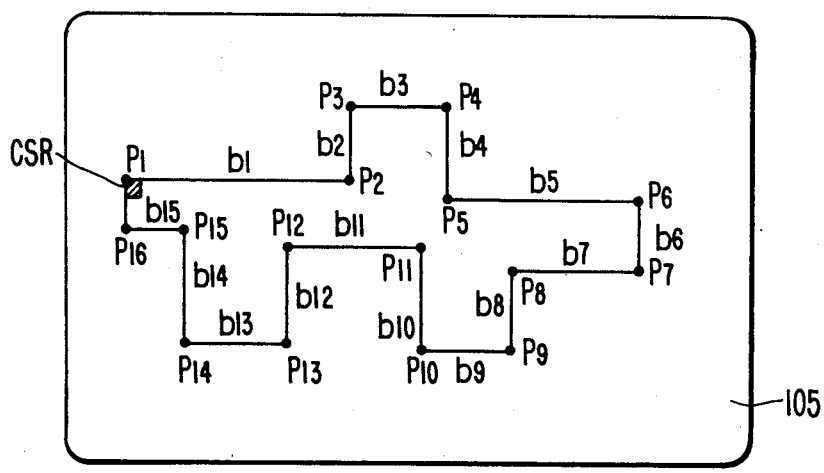
FIG. 2 is an explanatory view of a path trajectory and is useful in describing the method of the present invention.
Figure 3:
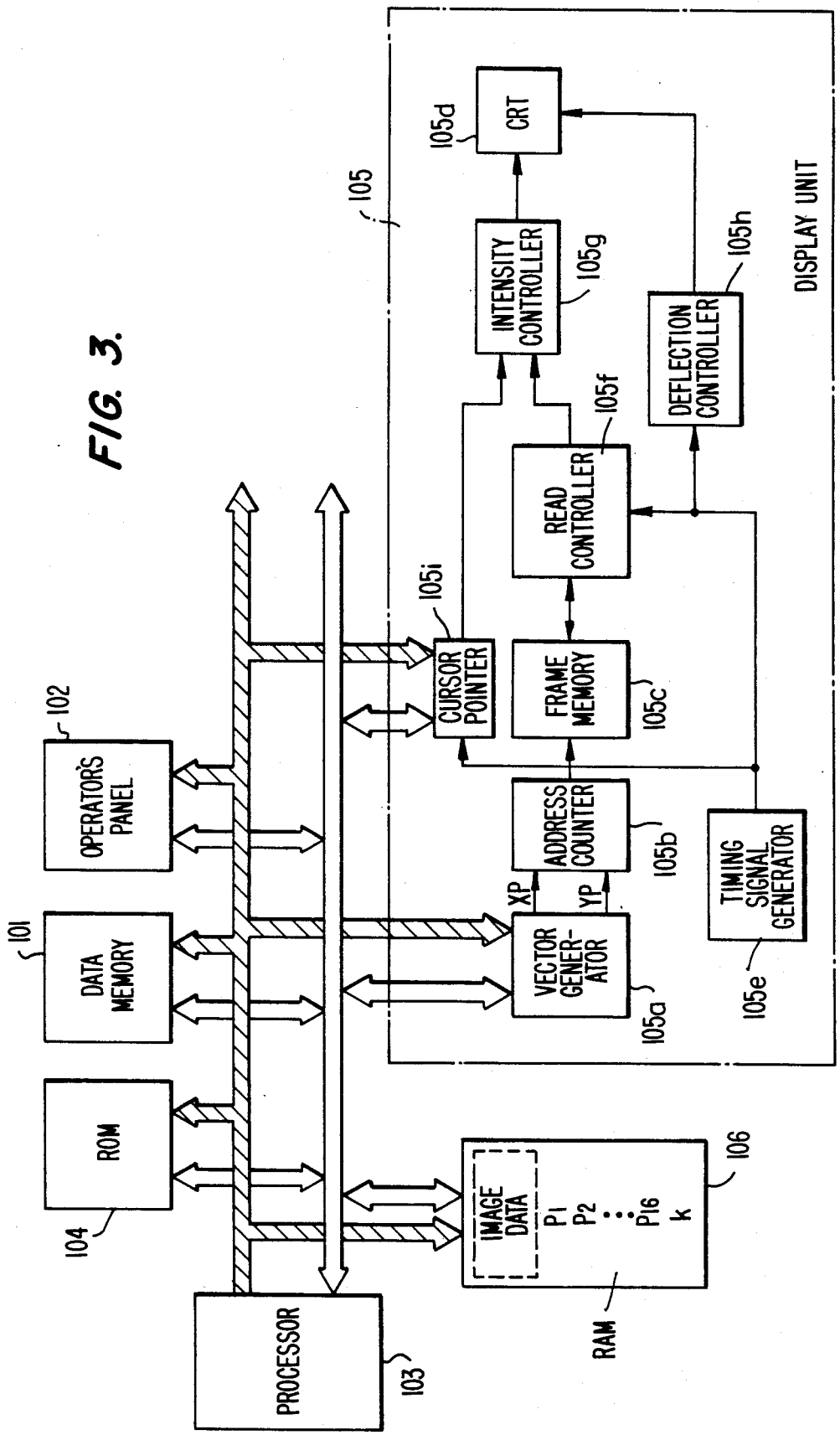
FIG. 3 is a block diagram of an embodiment of the present invention.

In FIG. 2, $P_1 \rightarrow P_2 \rightarrow P_3 \ldots \rightarrow P_{16} \rightarrow P_1$ represents a path trajectory, and CRS denotes a cursor. The path trajectory is displayed on a display unit 105 by using path data (a motion definition statement) previously created and stored in a data memory 101 (FIG. 3).

Figure 4:
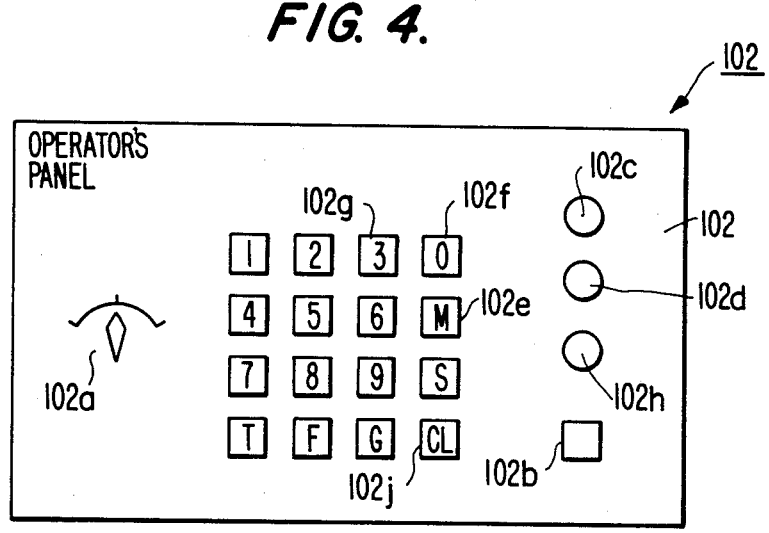
FIG. 4 is a view for describing an operator's panel of FIG. 3.

When a mode selection switch 102a (FIG. 4) on an operator's panel 102 is set to a miscellaneous data input mode and a start button 102 is pressed, a processor 103 executes processing for path trajectory display under the control of a control program stored in a ROM 104. Specifically, the processor 103 (FIG. 3) performs the operation $$0 \rightarrow k$$

reads path data out of the data memory 101 one block at a time in successive fashion, and converts the path data read into picture information which is then stored in a RAM 106. Following the conversion processing, the processor 103 applies the picture information (data indicating the distinction between straight lines and circular arcs, as well as starting points and end points, etc.) to a vector generator 105a of the display unit 105 one item at a time. The vector generator 105a uses the picture information input to perform an ordinary linear or circular interpolation calculation, to thus generate interpolated pulses XP, YP along the respective axes, which pulses are applied to an address counter 105b. The latter has two address counters, one for the X and the other for the Y axis. The counters count the interpolated pulses along the respective axes and write a "1" into a storage location of a frame memory 105c which is designated by the X- and Y-axis address counters each time. The frame memory 105c is of matrix construction and has one-bit storage locations corresponding to the pixel positions of the cathode-ray tube display screen. Each time an interpolation pulse is generated, a "1" is written into a storage location at a matrix cross point designated by the X- and Y-axis address counters. When a path trajectory has been stored in the frame memory 105c by the foregoing processing, the stored information is subsequently read out of the frame memory 105c in synchronism with the vertical and horizontal deflection of the CRT beam (this is referred to as raster scanning), and intensity modulation is performed using the stored information to display the tool path trajectory on a cathode-ray tube 105d. It should be noted that a timing signal generator 105e produces a timing signal for reading the stored information out of the frame memory 105c, and a timing signal (vertical and horizontal synchronizing signals) for deflecting the beam. A read controller 105f reads the stored information out of the frame memory 105c on the basis of the timing signal, and an intensity controller 105g performs intensity modulation based on the stored information. A deflection controller 105h deflects the beam horizontally and vertically in synchronism with the timing signal.

At the same time that the above-mentioned trajectory is generated, the positions of starting points $P_1$, $P_2$, ..., $P_{16}$ of respective path blocks $b_1$, $b_2$, ..., $b_{16}$ (FIG. 2) are stored successively in the RAM 106.

Next, the processor 103 reads a variable k stored in the RAM 106, reads the coordinate values of the starting point $P_{k+1}$ of a path block $b_{k+1}$ designated by (k+1) out of the RAM 106, and applies cursor display area data in accordance with the coordinate values $(X_{k+1}, Y_{k+1})$ of the starting point $P_{k+1}$ to a cursor pointer 105i. Let us assume that the horizontal and vertical dimensions of the cursor are W. The cursor display area data in such case will be the position $X_{cl}$ $(=X_{k+1})$ of the left edge of the cursor, the position $X_{c2}$ $(=X_{k+1}+W)$ of the right edge of the cursor, the position $Y_{cl}$ $(=Y_{k+1})$ of the upper edge of the cursor, and the position $Y_{c2}$ $(=Y_{k+1}-W)$ of the lower edge of the cursor. Since the timing signal from the timing signal generator 105e is also applied to a cursor pointer 105i, the latter is capable of recognizing the beam position. Therefore, when the beam position arrives at the cursor display area on the cathode-ray tube, the cursor pointer 105i delivers a cursor display signal to the intensity controller 105g to display the cursor.

Figure 6:
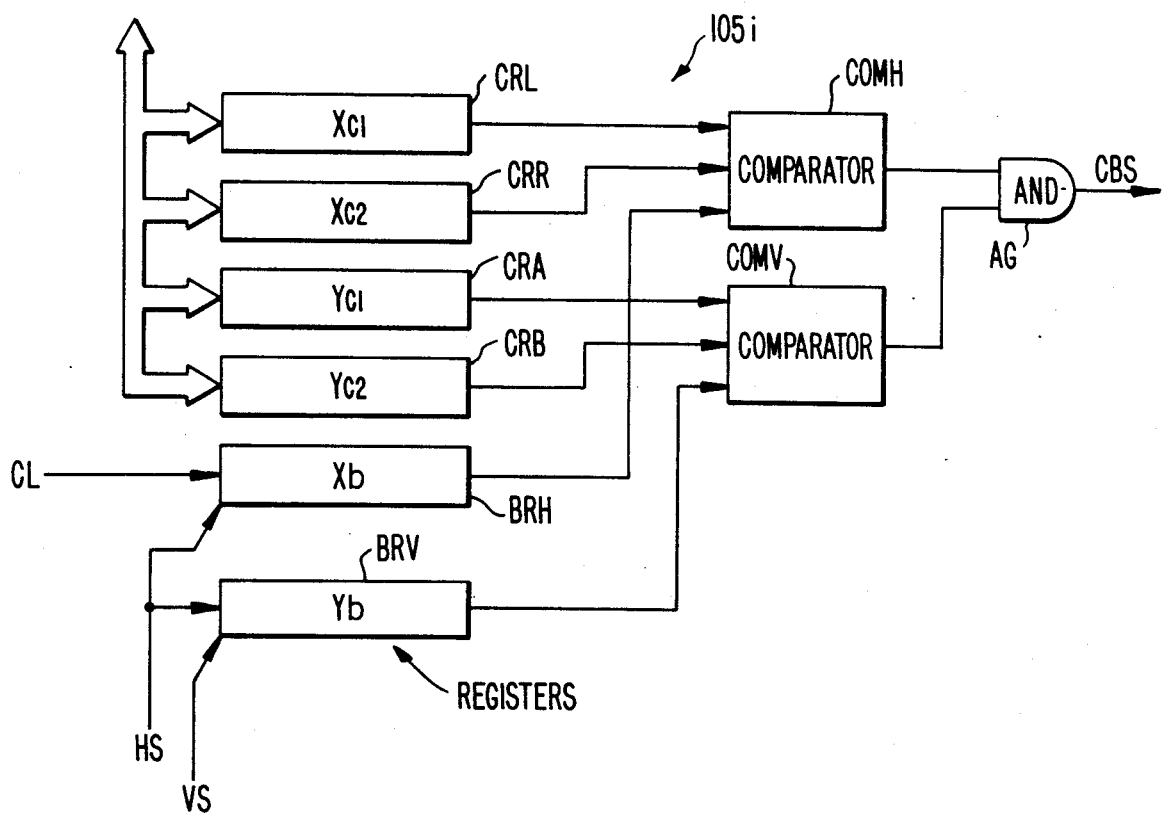
FIG. 6 is a block diagram of a cursor pointer of FIG. 3.

FIG. 6 is a block diagram of the cursor pointer 105i. The left- and right-edge positions $X_{c1}$, $X_{c2}$ of the cursor are stored in registers CRL, CRR, respectively, and the upper- and lower-edge positions $Y_{c1}$, $Y_{c2}$ of the cursor are stored in registers CRA, CRB, respectively. A register BRH has its status cleared by a horizontal sychronizing signal HS and counts clock pulses CL following generation of the horizontal synchronizing signal to monitor the position $X_b$ of the beam in the horizontal direction. A register BRV has its status cleared by a vertical sychronizing signal VS and counts the number of horizontal sychronizing signals HS following generation of the vertical synchronizing signal to monitor the position $Y_b$ of the beam in the vertical direction. A comparator COMH determines whether the following relation holds:

$$X_{cl} \leq X_b \leq X_{c2} \quad (1)$$

and a comparator COMV determines whether the following relation holds:

$$Y_{cl} \leq Y_b \leq Y_{c2} \quad (2)$$

When the relations (1) and (2) hold, an AND gate AG produces a high-level cursor display signal CBS. Accordingly, the cursor pointer 105i produces the cursor display signal CBS during the time that the beam resides in the cursor display area, in response to which the cursor is displayed at the starting point $P_{k+1}$. The cursor pointer 105i produces the cursor display signal on and off with every n-frame scan, thereby causing the cursor to blink. In the case described hereinabove, cursor display area data are generated and the cursor display signal CBS is produced to display the cursor on the cathode-ray tube when the beam arrives at the cursor display area. It should be noted, however, that an arrangement is possible wherein a cursor pattern is read out of a character generator, not shown, the cursor pattern is stored at a predetermined location of a character frame memory (not shown) designated by the point $P_{k+1}$, and the stored information (cursor pattern) is read out of the character frame memory to display the cursor on the cathode-ray tube 105d.

Figure 5:
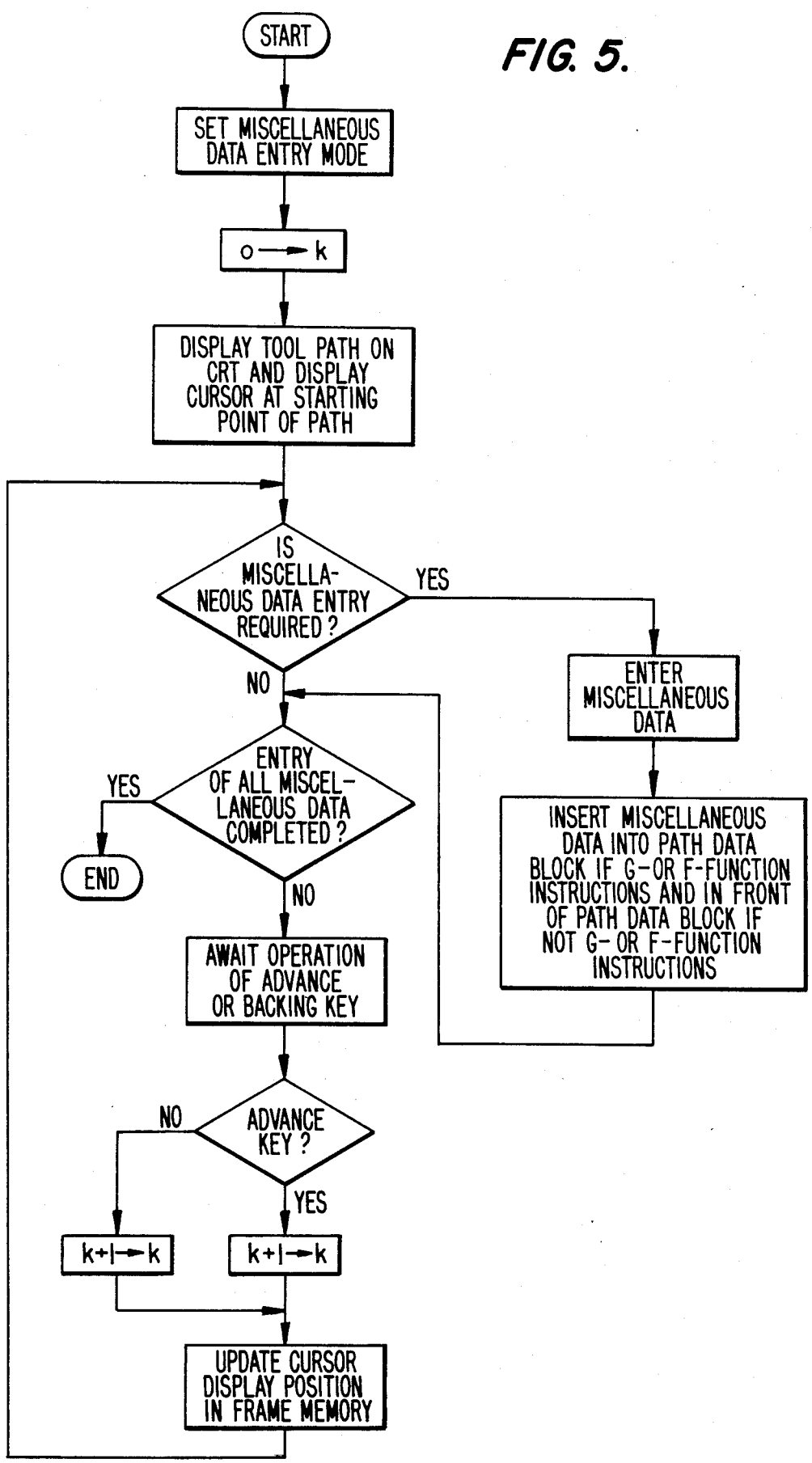
FIG. 5 is a flowchart of processing in the present invention.

Initially, the cursor CSR designates the point $P_1$ (FIG. 2). Under this condition, the operator decides whether miscelleneous data needs to be inserted in front of the path data designating the first path block $b_1$, or into the path data proper (FIG. 5). If the insertion of data is not required, an advance key 102c (FIG. 4) on the operator's panel 102 is pressed. When the advance key is pressed (FIG. 5), the processor 103 performs the operation $$k+1 \rightarrow k$$

reads the coordinate values of the starting point $P_2$ of the second path block $b_2$ out of the RAM 106 and, as set forth above, applies the coordinate values to the cursor pointer 105i to blink the cursor at the position of the point $P_2$ on the cathode-ray tube.

If, e.g. an item of miscellaneous data "M03" is to be inserted in front of the path data specifying the second path block $b_2$, a key "M" at 102e, a key "0" at 102f, and a key "3" at 102g are pressed, followed by pressing an input key 102h. This causes miscellaneous data "M03", stored together in an input register (not shown) within the operator's panel, to be read by the processor 103 for storage in the data memory 101. Thereafter, the processor 103, placed under the control of a data editing program stored in the ROM 104, inserts "M03;" as one independent block of miscellaneous data between the k-th path data and the (K−1)th path data, which are stored in the data memory 101. In a case where letters of the alphabet contained in the entered miscellaneous data are identified and the miscellaneous data are G- and F-function instructions, editing processing is performed in such a manner that these are inserted in the same block as that of the k-th path data.

Thereafter, as set forth above, the advance key 102c is operated to advance the cursor display position, and path data are entered at a prescribed position to insert the miscellaneous data into the path data. A backing key 102d is for backing up the cursor display position by one block. Each time this key is pressed, the processor 103 performs the operation k+1→k to update the value of the variable k. A key "CL" at 102j is for clearing the input data.

While the present invention has been described in detail in conjunction with the drawings, the invention is not limited to the illustrated embodiment. As an example, while the arrangement is such that miscellaneous data are inserted in front of path data corresponding to a path block designated by the cursor, it can be so arranged that the miscellaneous data are inserted in back of the path data.

Further, while it has been described that the cursor is displayed at the starting point of a block, an arrangement can be adopted wherein the cursor may be displayed at an intermediate position of the block as well as the starting point, with miscellaneous data entered when the cursor is displayed at the intermediate position of the block being inserted into the path data of this block, and miscellaneous data entered when the cursor is displayed at the starting point of the block being inserted in front of the block.

Thus, according to the present invention, a path trajectory comprising a number of path blocks is displayed on a display screen by using path data which have already been created, a cursor is displayed on the display screen so as to designate a prescribed path block, the position at which the cursor is displayed is moved, by operating switches provided on an operator's panel, to a position at which miscellaneous data are to be inserted, the miscellaneous data are then entered, and miscellaneous data are inserted into the same block as that of the path data which corresponds to the path block designated by the cursor, or at the front or rear of the block. An NC program can therefore be created or updated with new or miscellaneous data in simple fashion. The present invention is therefore useful for application to an apparatus for creating an NC program.

We claim:

1. An automatic programming method for creating an NC program by inserting miscellaneous data into previously created path data including path blocks, comprising the steps of:
    displaying a path trajectory comprising a number of the path blocks on a display screen by using said path data;
    positioning a cursor at a prescribed position on the path trajectory;
    accepting entry of the miscellaneous data; and
    inserting the miscellaneous data in front of or into the path data which corresponds to the path block designated by the cursor.

2. An automatic programming method according to claim 1, further comprising a step of obtaining starting point coordinates of each path block constituting the path trajectory, the cursor being displayed at a starting point of a designated path block by using said starting point coordinates.

3. An automatic programming method according to claim 1, wherein said method is performed by a numerical controller including a first switch for advancing the cursor and a second switch for backing up the cursor, the cursor being advanced one block at a time in a tool travelling direction each time the first switch is pressed, and the cursor being moved backward one block at a time in a direction opposite to the tool travelling direction each time the second switch is pressed.

4. An automatic programming method according to claim 1, wherein the step of inserting includes identifying a letter of the alphabet contained in the miscellaneous data and determining whether the miscellaneous data are to be inserted into path data designated by the cursor or in front of said path data in dependence upon the letter identified.

5. An automatic programming method according to claim 1, wherein the miscellaneous data includes M-function instruction data, T-function instruction data, S-function instruction data, feedrate instruction data and G-function instruction data.

6. An automatic programming method according to claim 1, wherein the step of inserting the miscellaneous data includes identifying whether the cursor is positioned at a starting point, an intermediate point, or an end point of the path block, and determining where the miscellaneous data is inserted in dependence on the point at which the cursor is positioned.

* * * * *

UNITED STATES PATENT AND TRADEMARK OFFICE
CERTIFICATE OF CORRECTION

PATENT NO. : 4,663,705
DATED : May 5, 1987
INVENTOR(S) : Hajimu Kishi et al

It is certified that error appears in the above-identified patent and that said Letters Patent is hereby corrected as shown below:

Column 3, line 1, change "M    " to --M00--.

Column 5, line 11, after "-mentioned", insert --path--.

Column 6, line 38, change "(K-1)" to --(k-1)--;
         line 52, change "k+1→k" to --k-1→k--.

Signed and Sealed this

Fifteenth Day of December, 1987

Attest:

DONALD J. QUIGG

*Attesting Officer*     *Commissioner of Patents and Trademarks*